(12) United States Patent
Kannan

(10) Patent No.: US 11,184,741 B1
(45) Date of Patent: Nov. 23, 2021

(54) SEPARATING BROADCAST AND MULTICAST WIRELESS TRAFFIC IN WLANS (WIRELESS LOCAL ACCESS NETWORKS) FOR QUARANTINE STATIONS

(71) Applicant: Fortinet, Inc., Sunnyvale, CA (US)

(72) Inventor: Venkatesh Kannan, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/013,612

(22) Filed: Sep. 6, 2020

(51) Int. Cl.
*H04W 4/06* (2009.01)
*H04W 12/08* (2021.01)
*H04W 88/08* (2009.01)
*H04W 84/12* (2009.01)

(52) U.S. Cl.
CPC .............. *H04W 4/06* (2013.01); *H04W 12/08* (2013.01); *H04W 84/12* (2013.01); *H04W 88/08* (2013.01)

(58) Field of Classification Search
CPC ....... H04W 4/06; H04W 88/08; H04W 12/08; H04W 84/12
See application file for complete search history.

(56) References Cited

U.S. PATENT DOCUMENTS

| 8,245,294 | B1* | 8/2012 | Zahra | H04L 63/14 726/22 |
| 8,671,451 | B1* | 3/2014 | Lambert | H04W 12/08 726/25 |
| 10,863,410 | B1* | 12/2020 | Wells | H04W 28/08 |
| 11,051,172 | B2* | 6/2021 | Avula | H04W 12/72 |
| 2011/0235502 | A1* | 9/2011 | Yamada | H04W 12/069 370/217 |

* cited by examiner

*Primary Examiner* — Brandon J Miller
(74) *Attorney, Agent, or Firm* — Law Office of Dorian Cartwright; Dorian Cartwright

(57) ABSTRACT

Quarantine stations are steered to a hidden virtual access point for quarantining multicast and broadcast traffic from other traffic on an access point, or other device. The hidden virtual access point can be spawned, with the same configurations as a non-quarantine virtual access point, for on demand traffic containment. The data stream transmitted over Wi-Fi to the quarantine client using a different GTK key generated under virtual access point of hidden SSID for encryption of the multicast or broadcast transmission, and the data packet stream transmitted over wi-fi to the non-quarantine station using different GTK key generated under virtual access point SSID of regular SSID for encryption of the multicast or broadcast transmission.

8 Claims, 5 Drawing Sheets

SEPARATING BROADCAST AND MULTICAST WIRELESS TRAFFIC IN WLANS (WIRELESS LOCAL ACCESS NETWORKS) FOR QUARANTINE STATIONS

FIELD OF THE INVENTION

The invention relates generally to computer network security, and more specifically, separating broadcast and multicast wireless traffic in WLANs (wireless local access networks) for quarantine stations.

BACKGROUND

In computer network security, rogue devices or even just suspicious devices are identified as being potentially dangerous to an enterprise network.

Today, rogue devices are isolated from the WLAN (wireless local access network) over a Wi-Fi network by placing them on a separate VLAN (virtual local access network). Problematically, rogue devices are still able to transmit multicast and broadcast traffic to other VLANs, and are still able to receive multicast and broadcast traffic from other VLANs. Network performance can be reduced in these circumstances.

What is needed is a robust technique for separating broadcast and multicast wireless traffic in WLANs for quarantine stations.

SUMMARY

To meet the above-described needs, methods, computer program products, and systems for separating broadcast and multicast wireless traffic in WLANs for quarantine stations.

In one embodiment, a first stream of data packets destined for a quarantine station and a second stream of data packets destined for a non-quarantine station, are received. Tracking a pool of SSIDs (service set identifiers), including a first SSID, and the SSID manager to track stations connected to the SSIDs from the pool of SSIDs.

In another embodiment, a hidden virtual access point associated with a hidden SSID from the pool of SSIDs, is spawned. The hidden SSID distinct from the first SSID and assigned to handle quarantine traffic. The quarantine station is steered to the hidden virtual access point. The first virtual access point configurations are updated to ignore probe requests and to exclude traffic associated with quarantine stations.

The first data packet stream is transmitted over Wi-Fi to the quarantine station using a second GTK key for encryption of the multicast or broadcast transmission, and the second data packet stream is transmitted over Wi-Fi to the non-quarantine station using a first GTK key for encryption of the multicast or broadcast transmission.

By creating virtual access point of hidden SSID with same configuration as first virtual access point and steering only quarantine clients to virtual access point of hidden SSID separates the broadcast and multicast traffic of quarantine and non-quarantine clients, since different GTK (group temporal key) is generated for each SSID created.

The data stream transmitted over Wi-Fi to the quarantine client using a different GTK key generated under virtual access point of hidden SSID for encryption of the multicast or broadcast transmission, and the data packet stream transmitted over Wi-Fi to the non-quarantine station using different GTK key generated under virtual access point ssid of regular SSID for encryption of the multicast or broadcast transmission.

Advantageously, network performance is improved with better network security and quarantined network traffic.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for separating broadcast and multicast wireless traffic in WLANs for quarantine stations.

I. Systems for Quarantining Multicast and Broadcast Traffic with Hidden SSIDs (FIGS. 1-2)

Figure 1:
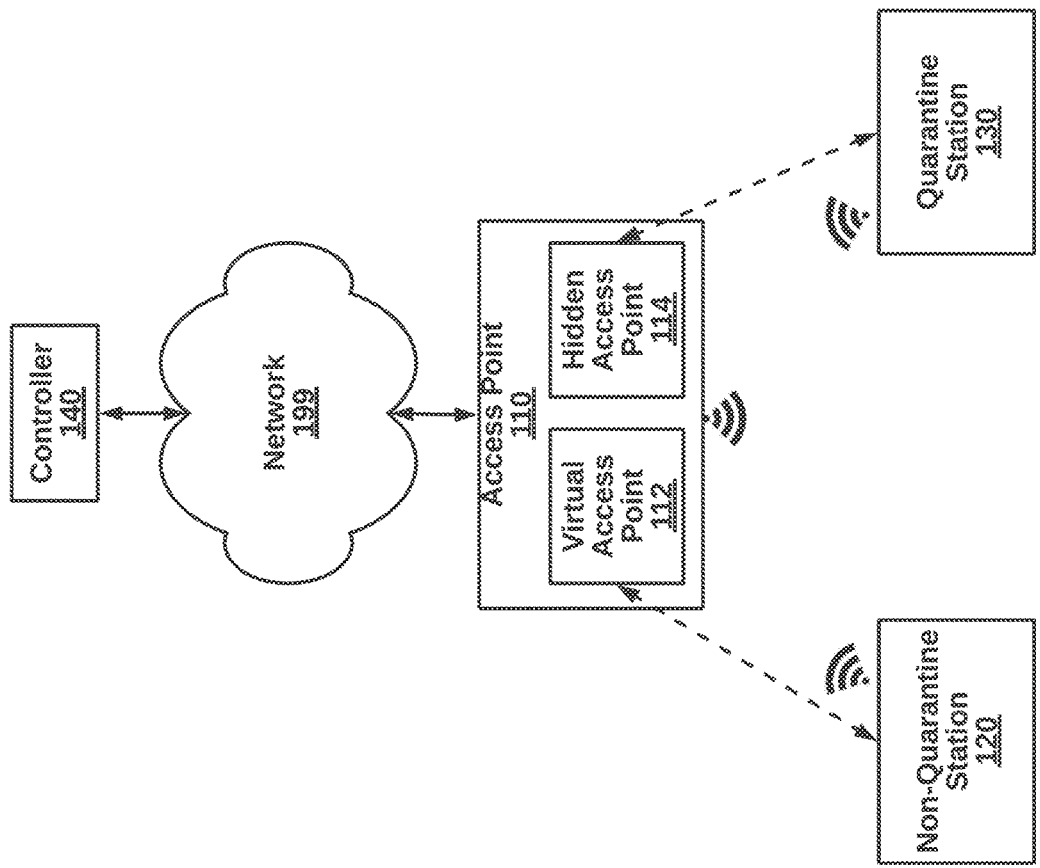
FIG. 1 is a high-level block diagram illustrating a system for quarantining multicast and broadcast traffic with a hidden SSID, according to one embodiment.
Figure 2:
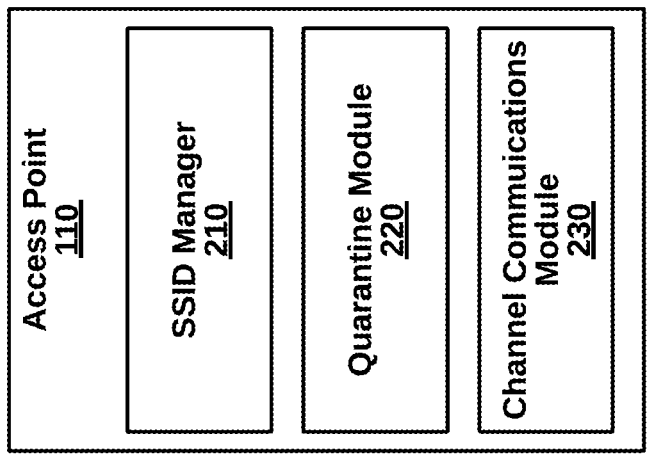
FIG. 2 is a more detailed block diagram illustrating an example access point of the system of FIG. 1, according to one embodiment.

FIG. 1 is a high-level block diagram illustrating a system 100 for quarantining multicast and broadcast traffic with a hidden SSID (service set identifier), according to one embodiment. The system 100 includes a controller, a Wi-Fi controller 105, access points 110A,B, a quarantine station 120, and a non-quarantine station 130, each directly or indirectly coupled in communication with a data communication system 101. Many other embodiments of the system 100 besides the present use case are possible. Components can be electrically coupled, wirelessly coupled, or otherwise coupled in data communication. Moreover, the network device 110 typically includes additional functionality depending on its role within the network architecture. Many other embodiments of the system 100 are possible, for example, other embodiments can include more access points or more controllers, firewalls, gateways, routers, switches, and other components of network architecture.

The data communication system 101 can be any data network, cellular network, wired or wireless, either currently available or developed in the future. For example, the Internet, a WLAN, a LAN, a Wi-Fi or IEEE 802.11 network, a 3G, 4G or 4G network, Bluetooth, or the like. In one implementation, the access points 110A,B, are hard wired to the data communication system 101 with an Ethernet cord on one side. On the other side, the access point 110 is wirelessly connected to stations (e.g., 120, 130). The Wi-Fi controller 130 is preferably hard wired to the data communication system 101. In some implementations the Wi-Fi controller 130 is on the same enterprise network as the other components, and in other implementations, the Wi-Fi controller 130 is located remotely over the Internet.

The access point 110 further comprises a first virtual access point 112 and a hidden virtual access point 114. The access point receives input data packets 101 for processing from the data communication system 101 at a network interface and transmits output data packets 103 downstream after processing. The access point 110 can be functionality can alternatively be implemented in other network devices, such as a gateway, a router, a switch, a firewall, a Wi-Fi controller, or any other device that processes network traffic.

The first virtual access point 112 is publicly accessible through advertisements broadcast to stations within range. The hidden virtual access point 114 is concealed from stations within range by suppressing any type of advertisements, in some embodiments. The standard access point traffic for non-quarantine station 120 can be handled through the first virtual access point 112. On the other hand, the access point 110A can steer quarantine station 110 to hidden virtual access point 114.

Multicast or broadcast traffic from the first virtual access point 112 is encrypted with a GTK key that is distributed to all stations once registering with the access point 110. Once steered from the first virtual access point 112 to the hidden virtual access point 114, the quarantine station 130 receives an updated GTK key. As a result, the non-quarantine station 120 is not able to see quarantine multicast and broadcast traffic, and at the same time, the quarantine station 130 is not able to see non-quarantine multicast and broadcast traffic. A first unique PTK (pairwise transit key) key for the non-quarantine station 120 and a second unique PTK key for the quarantine station 110 are initially the same, and they stay the same after steering. The PTK key is unique to each station in order to secure unicast data packets. In one embodiment, the quarantine station 130 receives lower QoS (quality of service) for network services relative to the non-quarantine station 120. In additional embodiments, other security features can be applied along with quarantining.

In one embodiment, the virtual access points are separate software and/or hardware instances of fully functional access points that are self-contained from each other, and reside on the same hardware. A separate VM (virtual machine) can be reserved for each execution of a virtual access point.

Additional embodiments of the access point 110 are set forth with more detail below in association with FIG. 2.

The non-quarantine station 120 receives multicasts and broadcasts for the first SSID while being protected from multicasts and broadcasts destined for the quarantine station 130. The non-quarantine station 120 can be a smartphone, a laptop, a tablet, an IoT (Internet of Things) device, a PC (personal computer), or the like. In one embodiment, the non-quarantine station 120 is a mobile, wireless device that senses the first access point 110A when within its range.

Figure 5:
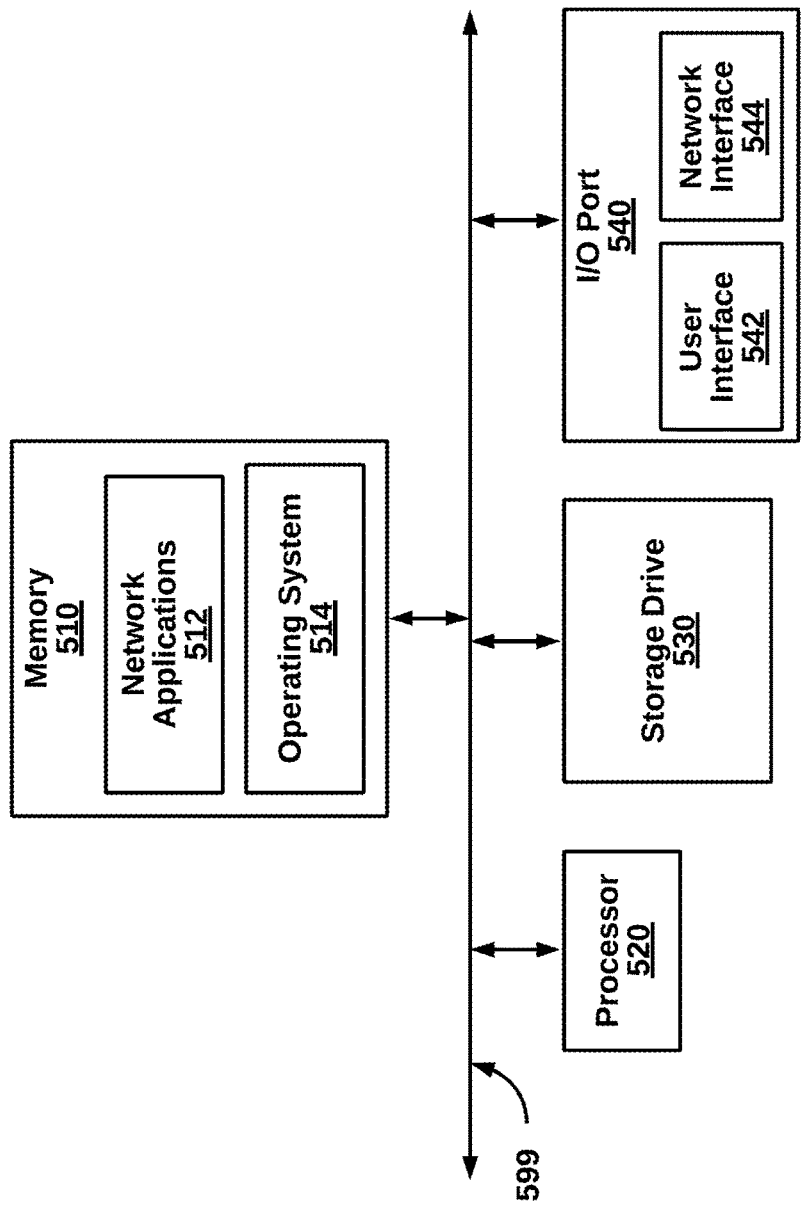
FIG. 5 is a block diagram illustrating an example computing device, according to one embodiment.

The quarantine station 130 receives multicasts and broadcasts for the hidden SSID while being excluded from multicasts and broadcasts destined for the non-quarantine station 120. The quarantine station 130 can be the same type of devices as the non-quarantine station 130. One computer hardware example of quarantine station 120 and the non-quarantine station 120 is shown in FIG. 5.

The Wi-Fi controller 130 can control quarantine from a network-wide view. In normal operations, the Wi-Fi controller 130 manages a plurality of access points. Settings from a station connected to a first access point can be transferred to a second access point, responsive to hand-offs of the station. In one embodiment, steering to hidden virtual access points is initiated by the Wi-Fi controller 130. In another embodiment, a quarantine station can be handed-off from a first hidden virtual access point to a second hidden virtual access point, at a different physical access point. The SSID can remain the same for the specific quarantine station at different access points, in virtual port mode.

FIG. 2 is a more detailed block diagram illustrating the access point 110 of the system of FIG. 1, according to one embodiment. The access point 110 includes an SSID manager 210, a quarantine module 220, and a channel communication module 230. The component functionalities can be implemented in hardware, microcode, high level software code, or a combination.

The SSID manager 210 tracks a pool of SSIDs that are distributed among several virtual access points. The SSIDs can be split by quarantine and non-quarantine, in an embodiment. Further splits within those categories can define QoS, bandwidth, security policy or the like. SSIDs can advertised using beacon packets that are broadcast over the Wi-Fi network to stations within range. When stations send probe packets to request a connection to an SSID, the SSID manager 210 tracks the connection. In some embodiments, the Wi-Fi controller 130 assigns SSIDs or is advised of SSID assignments of the access point 110. In other embodiments, the hidden SSIDs are suppressed from being advertised in the beacons.

The quarantine module 220 steers quarantine stations. In one case, one virtual access point stops responding to a specific station. A new key is provided for multicast and broadcast traffic over the hidden network. The quarantine module 220 can continue using the old SSID to the external network while separating the traffic internally, in one embodiment. The quarantine module 220 spawns a new virtual access point when a new quarantine channel is needed. The ne virtual access point can have the same configurations as the original, and then the SSID can be updated to handle the hidden SSID. In some embodiments, there are more than one hidden virtual access points on the same access point, as stations may be quarantined for different reasons and have different policies applied. The quarantine module 220 can also include security features for applying network security policies against the multicast and broadcast quarantine traffic.

The channel communication module 230 provides the data channel for communications. For example, a Wi-Fi transceiver sends and receives packets wirelessly to and from mobile stations. Also, Ethernet protocols, input/output ports, and other software and hardware are handled by the channel communications module 230. An operating system can receive a data stream from an application and packetize according to the OSI (open system interconnection) model.

II. Methods for Quarantining Multicast and Broadcast Traffic with Hidden SSIDs (FIGS. 3-4)

Figure 3:
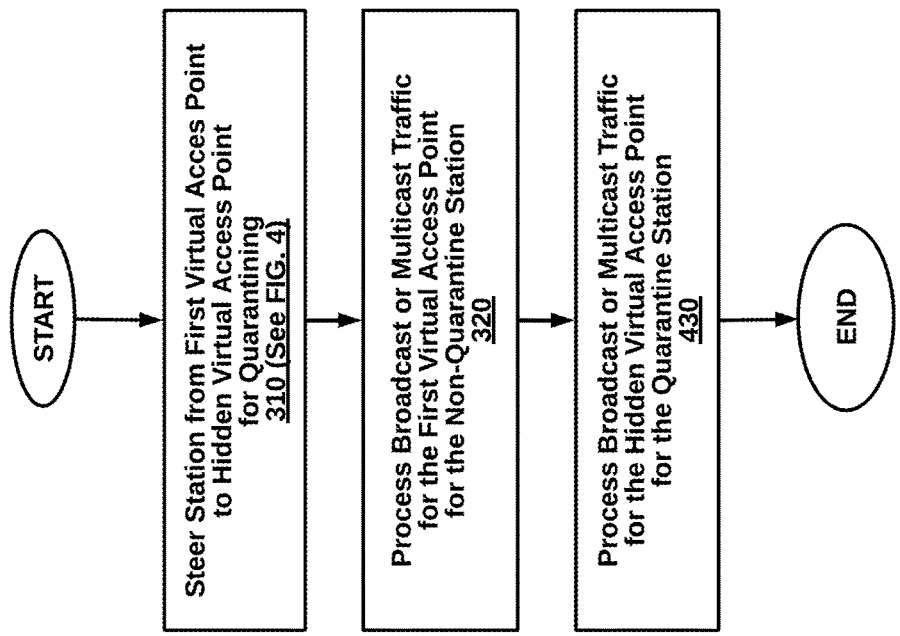
FIG. 3 is a high-level flow chart illustrating a method for quarantining multicast and broadcast traffic with a hidden SSID, according to one embodiment.
Figure 4:
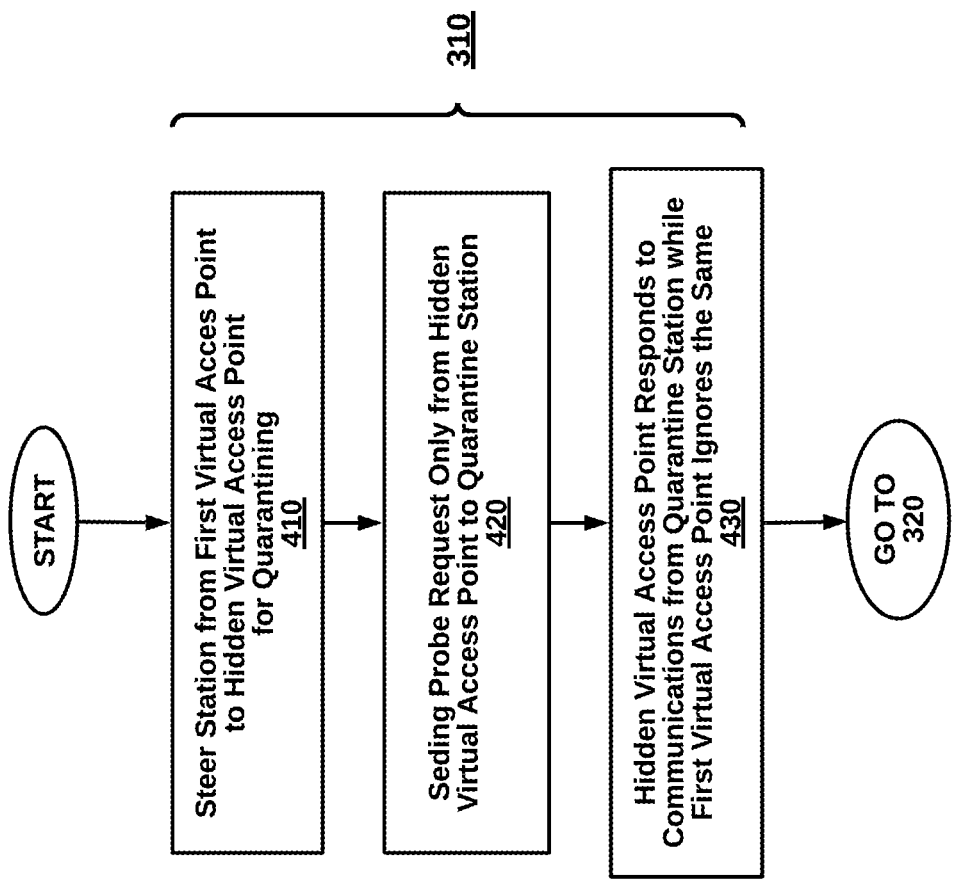
FIG. 4 is a more detailed flow chart illustrating a step of steering a quarantine station to a hidden virtual access point for traffic quarantining, of the method of FIG. 3, according to one embodiment.

FIG. 3 is a high-level flow diagram illustrating a method 300 for quarantining multicast and broadcast traffic, according to one embodiment. The method 500 can be implemented by, for example, the access point 110 of FIG. 1. The steps of the method can be performed as shown or in different orders, with additional steps included, over various embodiments.

At step 310, a station is steered to a hidden virtual access point for quarantining. As shown in more detail in FIG. 4, at step 410 quarantining begins with by spawning a hidden virtual access point, having SSID yy:yy:yy:yy:yy:yy on the same physical access point, as a first access point having SSID xx:xx:xx:xx:xx:xx. In an embodiment, configurations for the two virtual access points are the same. The spawned access point can update configurations as needed. At step 420, a handoff is completed by sending a probe request from the hidden virtual access point to the first virtual access point, on behalf of the quarantine station. At step 430, the hidden virtual access point responds to communications from the quarantine station while the first access point (and others) ignore communications from the quarantine station.

Referring again to FIG. 3, at step 320, multicast or broadcast traffic is received for a first virtual access point for processing. If the multicast traffic is for the first virtual access point, it is passed to the non-quarantine stations. These stations, because they share an SSID, also share a GTK key for encrypting and decrypting multicast and broadcast traffic. Only the non-quarantine clients authenticated by an access point for the first virtual access point are privy to the GTK key XX. If the multicast traffic is for any other virtual access point, it is ignored in order to avoid quarantine traffic. In still another embodiment, the PTK key for encrypting and decrypting unicast traffic of a station can remain the same during quarantine.

At step 330, multicast or broadcast traffic is received for a hidden virtual access point for processing. If the multicast traffic is for the hidden virtual access point, it is passed to the quarantine stations. These stations, in an embodiment, have a different SSID that is distinct from the non-quarantine SSID. A GTK key YY for this station group, in an embodiment, has been updated to correspond with the hidden SSID and to prevent mixing of multicast and broadcast traffic. In some embodiments, the hidden SSID is only internal to an access point and the first SSID is used for the external network is substituted as traffic is exchanged.

Many other embodiments of the method 330 and others are possible, given the disclosure herein. For example, a quarantine can be ended and the quarantine station status updated to non-quarantine. In another example, an access point having MIMO enabled transmit quarantine traffic over a first antennae and transmit non-quarantine over a second antennae. One of ordinary skill in the art will recognize additional possible examples.

III. Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, such as the access point 110, the quarantine station 120, the non-quarantine station 130, and the Wi-Fi controller 140. Additionally, the computing device 500 is merely an example implementation itself, since the system 100 can also be fully or partially implemented with laptop computers, tablet computers, smart phones, Internet appliances, and the like.

The computing device 500, of the present embodiment, includes a memory 510, a processor 520, a hard drive 530, and an I/O port 540. Each of the components is coupled for electronic communication via a bus 599. Communication can be digital and/or analog, and use any suitable protocol.

The memory 510 further comprises network applications 512 and an operating system 514. The network applications 520 can include the modules of network applications. Other network applications can include 512 a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 10), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 520 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The storage device 530 can be any non-volatile type of storage such as a magnetic disc, EEPROM, Flash, or the like. The storage device 530 stores code and data for applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. An access point device, coupled in communication with a data communication network, that improves network security by protecting non-quarantine stations from multicast and broadcast traffic of quarantine stations on a Wi-Fi network with hidden virtual access points, the access point device comprising:
   a processor;
   a network communication interface, coupled to the processor and coupled in communication with the data communication network on a first transceiver and coupled in communication with the Wi-Fi network on a second transceiver, to receive a first stream of data packets destined for a quarantine station and to receive a second stream of data packets destined for a non-quarantine station; and
   a memory device, coupled to the processor, the memory device having stored:
      an SSID manager to track a pool of SSIDs (service set identifiers), including a first SSID, and the SSID manager to track stations connected to the SSIDs from the pool of SSIDs, and
      a quarantine module to spawn a hidden virtual access point associated with a hidden SSID from the pool of SSIDs, the hidden SSID distinct from the first SSID and assigned to handle quarantine traffic, and the quarantine module steering the quarantine station to the hidden virtual access point,
      wherein the first virtual access point configurations are updated to ignore probe requests and to exclude traffic associated with quarantine stations,
      wherein the network communication interface transmits the first data packet stream to the quarantine station using a second GTK key for encryption of the multicast or broadcast transmission, and transmits the second data packet stream using a first GTK key for encryption of the multicast or broadcast transmission.

2. The access point device of claim 1, further comprising: suppressing the hidden SSID from advertisement beacons broadcasting available virtual access points; and suppressing the SSID field from advertisement beacons for quarantine clients.

3. The access point device of claim 1, wherein a Wi-Fi controller manages a plurality of access points including the access point, and wherein the Wi-Fi controller steers the quarantine station from the hidden virtual access point of the access point to a second hidden virtual access point of a second access point.

4. The access point device of claim 1, wherein the hidden virtual access point configurations are based on the first virtual access point configurations, updated to exclude traffic associated with non-quarantined stations.

5. The access point device of claim 1, wherein the quarantine station and the non-quarantine stations both maintain a separate PTK key after steering.

6. The access point device of claim 1, wherein the quarantine station and the non-quarantine stations both initially use a first GTK key, and the quarantine station receives a second GTK key responsive to being steered to the hidden virtual access point, the GTK key for encrypting and decrypting multicast traffic and broadcast traffic, the PTK key each for encrypting and decrypting unicast traffic for a particular station.

7. A method, in an access point device, coupled in communication with a data communication network, that improves network security by protecting non-quarantine stations from multicast and broadcast traffic of quarantine stations on a Wi-Fi network with hidden virtual access points, the method comprising:
   receiving, at a network communication interface coupled to a processor and coupled in communication with the data communication network on a first transceiver and coupled in communication with the Wi-Fi network on a second transceiver, a first stream of data packets destined for a quarantine station and receiving a second stream of data packets destined for a non-quarantine station; and
   tracking, with an SSID (service set identifier) manager, a pool of SSIDs, including a first SSID, and the SSID manager to track stations connected to the SSIDs from the pool of SSIDs, and
   spawning, with a quarantine module, a hidden virtual access point associated with a hidden SSID from the pool of SSIDs, the hidden SSID distinct from the first SSID and assigned to handle quarantine traffic; and
   steering the quarantine station to the hidden virtual access point, wherein the first virtual access point configurations are updated to ignore probe requests and to exclude traffic associated with quarantine stations, wherein the network communication interface transmits the first data packet stream to the quarantine station using a second GTK key for encryption of the multicast or broadcast transmission, and transmits the second data packet stream using a first GTK key for encryption of the multicast or broadcast transmission.

8. A non-transitory medium storing computer readable sourced code that, when executed by a processor, perform a method, in an access point device, coupled in communication with a data communication network, that improves network security by protecting non-quarantine stations from multicast and broadcast traffic of quarantine stations on a Wi-Fi network with hidden virtual access points, the method comprising:
   receiving, at a network communication interface coupled to a processor and coupled in communication with the data communication network on a first transceiver and coupled in communication with the Wi-Fi network on a second transceiver, a first stream of data packets destined for a quarantine station and receiving a second stream of data packets destined for a non-quarantine station; and
   tracking, with an SSID (service set identifier) manager, a pool of SSIDs, including a first SSID, and the SSID manager to track stations connected to the SSIDs from the pool of SSIDs, and
   spawning, with a quarantine module, a hidden virtual access point associated with a hidden SSID from the pool of SSIDs, the hidden SSID distinct from the first SSID and assigned to handle quarantine traffic; and steering the quarantine station to the hidden virtual access point, wherein the first virtual access point configurations are updated to ignore probe requests and to exclude traffic associated with quarantine stations, wherein the network communication interface transmits the first data packet stream to the quarantine station using a second GTK key for encryption of the multicast or broadcast transmission, and transmits the second data packet stream using a first GTK key for encryption of the multicast or broadcast transmission.

* * * * *